United States Patent
Yoshida et al.

(10) Patent No.: US 10,868,617 B2
(45) Date of Patent: Dec. 15, 2020

(54) CHROMATIC DISPERSION COMPENSATION DEVICE, CHROMATIC DISPERSION COMPENSATION METHOD, AND COMMUNICATION DEVICE

(71) Applicants: NTT Electronics Corporation, Yokohama (JP); NIPPON TELEGRAPH AND TELEPHONE CORPORATION, Tokyo (JP)

(72) Inventors: Mitsuteru Yoshida, Kanagawa (JP); Etsushi Yamazaki, Kanagawa (JP); Yoshiaki Kisaka, Kanagawa (JP); Masahito Tomizawa, Kanagawa (JP)

(73) Assignees: NTT Electronics Corporation, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/339,248

(22) PCT Filed: Oct. 6, 2017

(86) PCT No.: PCT/JP2017/036469
§ 371 (c)(1),
(2) Date: Apr. 3, 2019

(87) PCT Pub. No.: WO2018/100884
PCT Pub. Date: Jun. 7, 2018

(65) Prior Publication Data
US 2020/0067598 A1    Feb. 27, 2020

(30) Foreign Application Priority Data
Nov. 30, 2016  (JP) ................................ 2016-232848

(51) Int. Cl.
*H04B 10/2513* (2013.01)
*H04B 10/61* (2013.01)
(Continued)

(52) U.S. Cl.
CPC . *H04B 10/25133* (2013.01); *H04B 10/07951* (2013.01); *H04L 27/2628* (2013.01)

(58) Field of Classification Search
CPC .......... H04B 10/2513; H04B 10/25133; H04B 10/66–6973
See application file for complete search history.

(56) References Cited

U.S. PATENT DOCUMENTS

| | | | | |
|---|---|---|---|---|
| 2002/0123851 A1* | 9/2002 | Kurooka | ............ | H04B 10/2513 702/69 |
| 2004/0037572 A1* | 2/2004 | Matsuyama | ....... | H04B 10/2513 398/208 |

(Continued)

FOREIGN PATENT DOCUMENTS

| | | |
|---|---|---|
| JP | 2010-57139 A | 3/2010 |
| JP | 2010-278562 A | 12/2010 |
| WO | 2016/034246 A1 | 3/2016 |

OTHER PUBLICATIONS

Suzuki et al., "R&D on the Digital Coherent Signal Processing Technology for Large-capacity Optical Communication Networks", The journal of the Institute of Electronics, Information and Communication Engineers, vol. 95, No. 12, pp. 1100-1116, Dec. 2012, with partial English translation.

(Continued)

*Primary Examiner* — Nathan M Cors
(74) *Attorney, Agent, or Firm* — Myers Wolin, LLC.

(57) ABSTRACT

A band division timing adjustment unit aligns timings of a plurality of signals, which are generated by dividing a received signal according to a plurality of frequency bands, in a time domain and combines the plurality of signals for (Continued)

which the timings have been aligned. A chromatic dispersion compensation unit compensates chromatic dispersion of an output signal of the band division timing adjustment unit for each of the plurality of frequency bands.

9 Claims, 13 Drawing Sheets

(51) Int. Cl.
*H04B 10/079* (2013.01)
*H04L 27/26* (2006.01)

(56) References Cited

U.S. PATENT DOCUMENTS

| | | | | |
|---|---|---|---|---|
| 2009/0238578 A1* | 9/2009 | Taylor | .............. | H04B 10/25133 398/147 |
| 2010/0221021 A1* | 9/2010 | Onaka | ................... | H04B 10/671 398/208 |
| 2012/0070159 A1* | 3/2012 | Ishihara | ........... | H04B 10/07951 398/202 |
| 2018/0091288 A1* | 3/2018 | Zamani | ................. | H04L 7/0278 |

OTHER PUBLICATIONS

Kudo et al., "Coherent Optical Single Carrier Transmission Using Overlap Frequency Domain Equalization for Long-Haul Optical Systems", Journal of Lightwave Technology, vol. 27, No. 16, pp. 3721-3728, Aug. 15, 2009.

Notification of Reasons for Refusal issued by the Japan Patent Office for corresponding Japanese Patent Application No. 2016-232848, dated Nov. 21, 2017, with a partial English translation.

International Search Report issued by the Japan Patent Office for corresponding International Patent Application No. PCT/JP2017/036469, dated Nov. 28, 2017, with an English translation.

Translation of the International Preliminary Report on Patentability issued by the International Bureau of WIPO for corresponding International Patent Application No. PCT/JP2017/036469, dated Jun. 13, 2019.

Extended European search report with supplementary European search report and the European search opinion issued by the European Patent Office for corresponding European Patent Application No. 17875790.2-1220, dated Apr. 17, 2020.

* cited by examiner

CHROMATIC DISPERSION COMPENSATION DEVICE, CHROMATIC DISPERSION COMPENSATION METHOD, AND COMMUNICATION DEVICE

CROSS REFERENCE TO RELATED APPLICATIONS

This application is a National Phase application under 35 U.S.C. 371, of international application No. PCT/JP2017/036469, filed on Oct. 6, 2017, now pending, which claims foreign priority to Japanese Patent Application No. 2016-232848, filed on Nov. 30, 2016, the contents of each are herein wholly incorporated by reference.

FIELD

The present invention relates to a chromatic dispersion compensation device, a chromatic dispersion compensation method and a communication device in optical communication.

BACKGROUND

In coherent optical communication, there is a problem that, when an optical signal modulated at a high speed propagates through an optical fiber, chromatic dispersion occurs, and a received signal waveform is distorted. Chromatic dispersion is a phenomenon that the speed of light traveling through an optical fiber differs according to wavelength (frequency). That is, delay time at the time of light propagating through an optical fiber differs according to frequencies. Since an optical signal has a plurality of frequency components, waveform distortion occurs due to influence of chromatic dispersion. The longer the length of an optical fiber is, the stronger the influence of chromatic dispersion is. Therefore, increase in capacity is attempted by performing compensation for transmission characteristics and accurate synchronization of the amount of delay mainly on a reception side.

PTL 1 schematically shows the influence of chromatic dispersion (a relationship of delay time according to frequencies) and shows a method for performing compensation by adding inverse characteristics in a frequency domain or a time domain. NPL 1 shows a method for performing compensation in a frequency domain by digital signal processing on a reception side. In this method, a received signal existing in a time domain is converted to a frequency domain by Fourier transform, and the received signal converted to the frequency domain is multiplied by a transfer function inverse to chromatic dispersion characteristics and returned to the time domain again by inverse Fourier transform.

CITATION LIST

Patent Literature

[PTL 1] JP. 2010-278562 A

Non Patent Literature

[NPL 1] General Report "R & D on the Digital Coherent Signal Processing Technology for Large-capacity Optical Communication Networks", Sen-ichi Suzuki et al., The journal of the Institute of Electronics, Information and Communication Engineers, Vol. 95, No. 12, 2012, pp. 1100-1116

SUMMARY

Technical Problem

In the conventional chromatic dispersion compensation method, however, it is necessary to increase the amount of delay time to be compensated as the length of an optical fiber increases. Therefore, there is a problem that increase in the size of a compensation unit itself is caused. Further, there may be a case where compensation cannot be performed by an implemented compensation unit. Especially, in the method of performing conversion to a frequency domain by Fourier transform to perform compensation in the frequency domain, processing is performed for every finite number of samples. In the case of performing processing by Fourier transform, it is necessary to increase the amount of overlap between adjoining processing ranges according to the amount of delay time. Therefore, there is a problem that a rate of the amount of overlap in Fourier transform processing increases, which causes deterioration of processing speed and increase in power consumption.

The present invention has been made to solve the problems as described above, and an object is to obtain a chromatic dispersion compensation device capable of efficiently performing chromatic dispersion compensation even when delay time due to chromatic dispersion is long, a chromatic dispersion compensation method and a communication device.

Solution to Problem

A chromatic dispersion compensation device according to the present invention includes: a band division timing adjustment unit aligning timings of a plurality of signals, which are generated by dividing a received signal according to a plurality of frequency bands, in a time domain and combining the plurality of signals for which the timings have been aligned; and a chromatic dispersion compensation unit compensating chromatic dispersion of an output signal of the band division timing adjustment unit for each of the plurality of frequency bands.

Advantageous Effects of Invention

The present invention makes it possible to efficiently perform chromatic dispersion compensation even when delay time due to chromatic dispersion is long.

DESCRIPTION OF EMBODIMENTS

A chromatic dispersion compensation device, a chromatic dispersion compensation method and a communication device according to the embodiments of the present invention will be described with reference to the drawings. The same components will be denoted by the same symbols, and the repeated description thereof may be omitted.

First Embodiment

Figure 1:
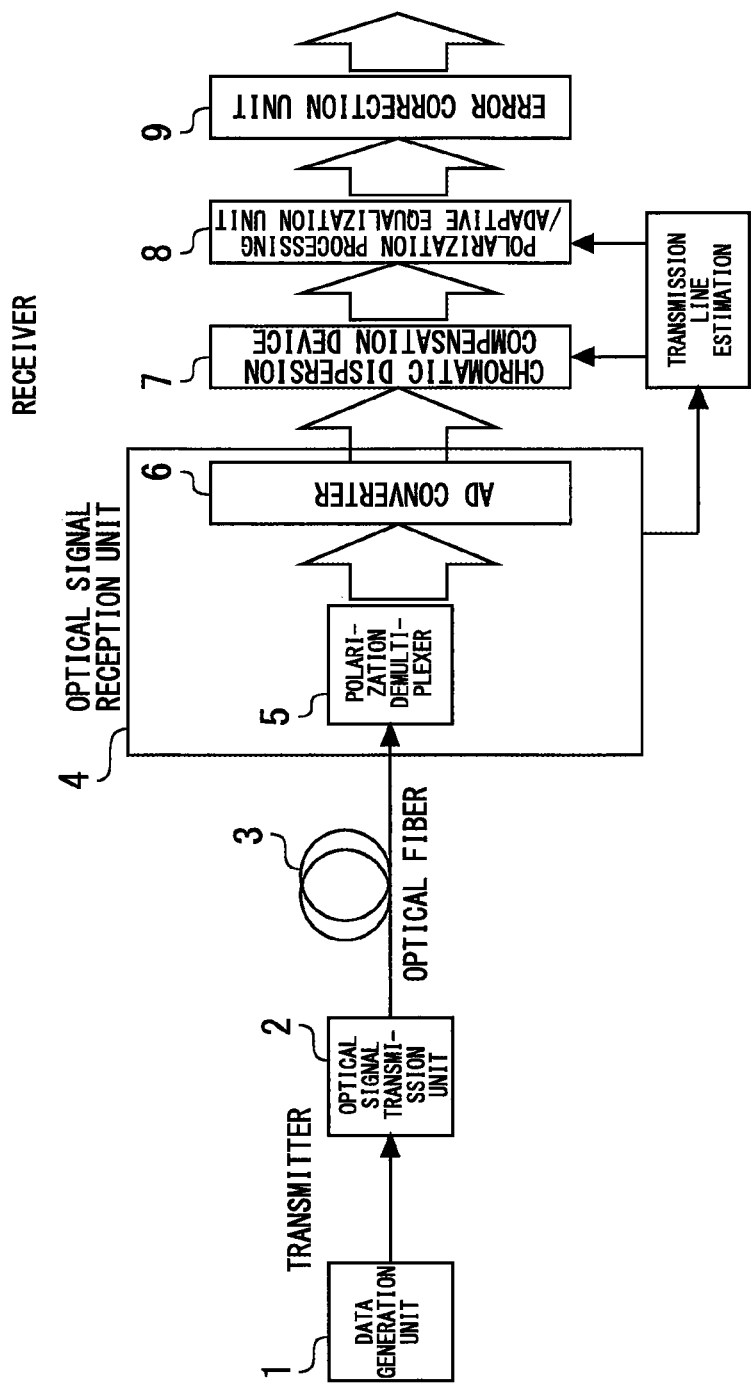
FIG. 1 is a diagram showing a communication device according to a first embodiment of the present invention.

FIG. 1 is a diagram showing a communication device according to a first embodiment of the present invention. In a transmitter, an optical signal transmission unit 2 converts data generated by a data generation unit 1 to an optical signal and transmits the optical signal to an optical fiber 3. In a receiver, an optical signal reception unit 4 receives the optical signal from the optical fiber 3 and converts the optical signal to a received signal.

In the optical signal reception unit 4, a polarization demultiplexer 5 splits the optical signal into two orthogonal polarization components. These optical signals and a local oscillation light of a local oscillation light source (not shown) are inputted to a 90° hybrid circuit (not shown), and a total of four output lights, a pair of output lights obtained by causing both kinds of lights to interfere with each other in the same phase and in opposite phases and a pair of output lights obtained by causing both kinds of lights to interfere with each other orthogonally (90°) and inversely orthogonally (−90°). Each of the output lights is converted to an analog signal by a photodiode (not shown). These analog signals are converted to received signals, which are digital signals, by an AD converter 6.

When an optical signal propagates in the optical fiber 3, the signal waveform is distorted due to chromatic dispersion. A chromatic dispersion compensation device 7 estimates the magnitude of the distortion from a received signal and compensates the distortion of the received signal due to chromatic dispersion. Further, when, in optical communication, a horizontally polarized wave and a vertically polarized wave are combined and transmitted, and then split at reception, polarization fluctuation occurs due to polarization mode dispersion, and the waveform is distorted. A polarization processing/adaptive equalization unit 8 performs equalization processing for compensating the distortion of the received signal due to the polarization fluctuation. Polarization demultiplexing is performed by an optical demodulator first, and processing of polarization demultiplexing is more completely performed by the polarization processing/adaptive equalization unit 8. A method and the like are proposed in which a training signal or a pilot signal is inserted on a transmission side, and an error relative to the signal which has been received is minimized. After that, an error correction unit 9 detects and corrects an error of the received signal.

Figure 2:
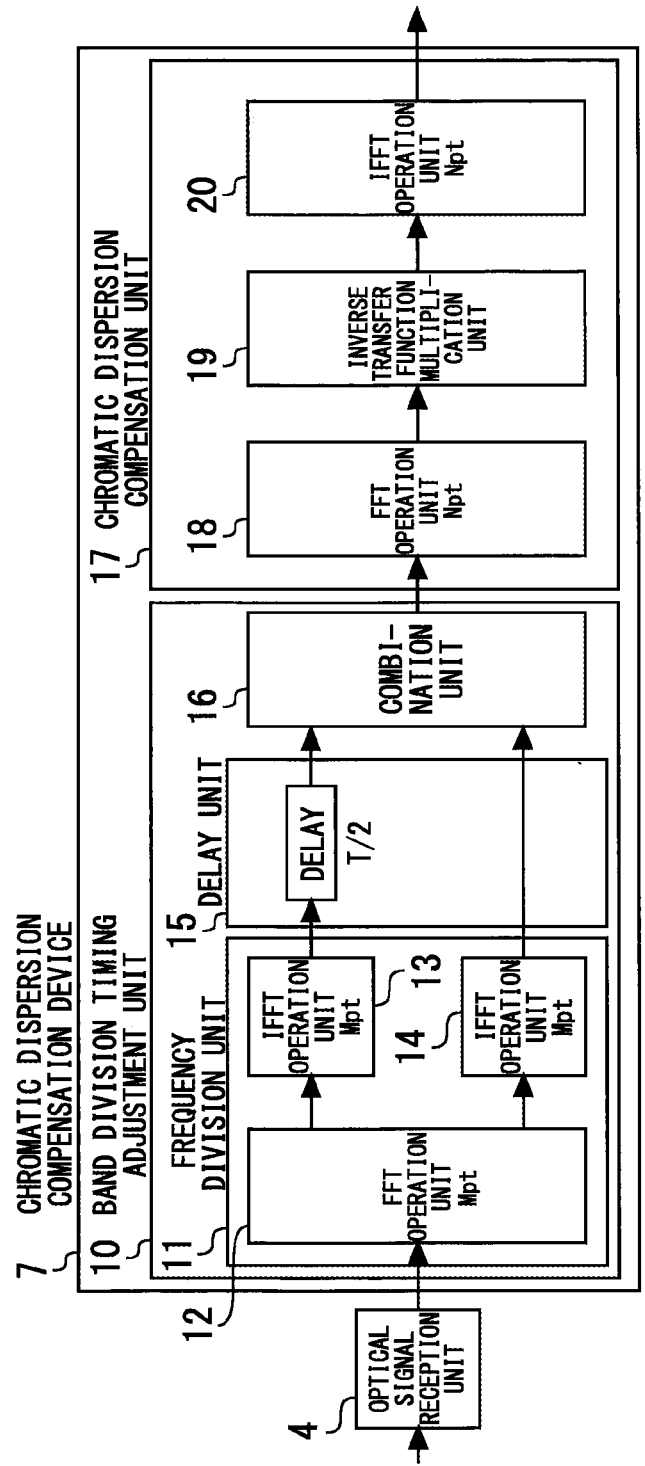
FIG. 2 is a diagram showing a chromatic dispersion compensation device according to the first embodiment of the present invention.

FIG. 2 is a diagram showing a chromatic dispersion compensation device according to the first embodiment of the present invention. In a band division timing adjustment unit 10, a frequency division unit 11 divides a received signal converted to sample data according to two frequency bands and outputs two signals. The frequency division unit 11 has an FFT operation unit 12 and two IFFT operation units 13 and 14. A delay unit 15 adjusts the amount of delay to align timings of the two signals in a time domain. A combination unit 16 combines the two signals for which the timings have been aligned to obtain one signal again.

Next, a chromatic dispersion compensation unit 17 compensates chromatic dispersion of the output signal of the band division timing adjustment unit 10 for each of the two frequency bands. The chromatic dispersion compensation unit 17 has an FFT operation unit 18, an inverse transfer function multiplication unit 19 and an IFFT operation unit 20.

Figure 3:
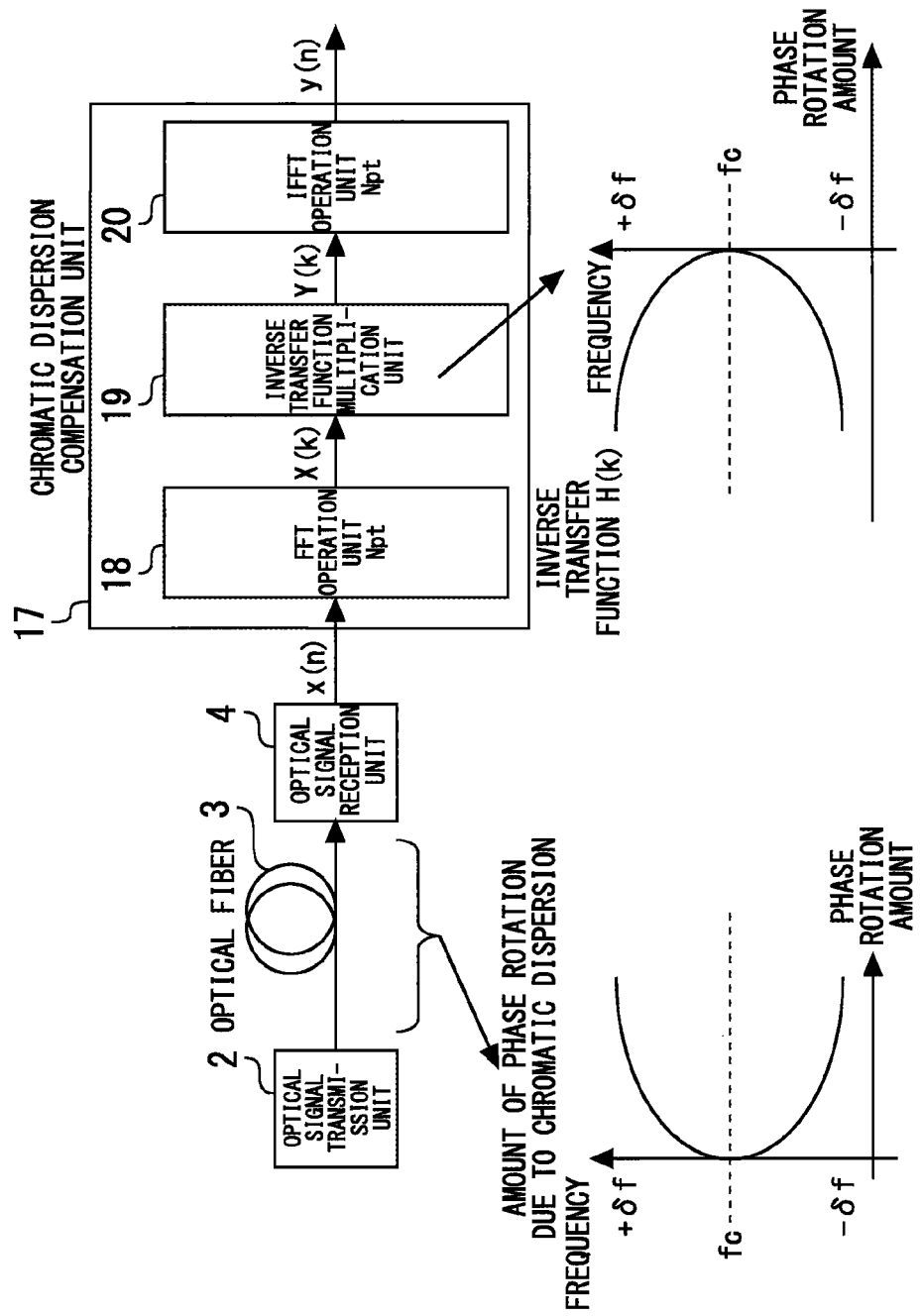
FIG. 3 is a diagram showing a communication device according to the comparative example.

Next, an operation of the present embodiment will be described in comparison with a comparative example. FIG. 3 is a diagram showing a communication device according to the comparative example. The band division timing adjustment unit 10 does not exist in the comparative example.

If it is assumed that an occupied bandwidth of a transmitted signal is F GHz, the wavelength spread is 1 nm, and chromatic dispersion on an optical transmission line including the optical fiber 3 is Dps/nm, then delay time in a receiver is Dps/nm×1 nm=Dps. The amount of phase rotation relative to frequencies spread from a center frequency fc due to chromatic dispersion is generally indicated by the following formula (see, for example, PTL 1).

$$g(f) = \exp(j\phi) = \exp\left\{jL\left[\frac{\pi\lambda^2}{c}D(f_c-f)^2 + \frac{\pi}{3}\left(\frac{\lambda^2}{c}\right)^2 D_{slope}(f_c-f)^3\right]\right\} \quad \text{[Math. 1]}$$

The amount of phase rotation due to chromatic dispersion is shown at a lower left of FIG. 3. Here, the amount of phase rotation at the center frequency fc is regarded as a basis (zero). The actual amount of phase rotation corresponds to a part of φ in exp(jφ). When it is thought that a third-degree term is smaller than a second-degree term and can be ignored, the amount of phase rotation can be approximated with a quadratic function of a frequency difference fc−f from the center frequency fc. When light velocity is indicated by c, spread of wavelength is indicated by c/(fc−δf)−c/(fc+δf).

In the chromatic dispersion compensation unit 17, the FFT operation unit 18 converts a received signal x(n) to a frequency domain X(k) by FFT (fast Fourier transform).

$$X(k) = \sum_{n=0}^{N-1} x(n)e^{-j\frac{2\pi}{N}nk} \quad \text{[Math. 2]}$$

Here, n is a variable related to time showing order of sampling in a time domain, and k is a variable related to frequencies in a frequency domain.

Next, the inverse transfer function multiplication unit 19 performs multiplication by H(k)=exp(−jφ) so that the above phase rotation becomes reverse rotation. Thereby, delay relative to frequencies due to chromatic dispersion can be compensated (offset).

$$X(k) \cdot H(k) = Y(k) \qquad \text{[Math. 3]}$$

Next, the IFFT operation unit 20 returns Y(k) to a time-domain signal y(n) by IFFT (inverse fast Fourier transform).

$$y(n) = \sum_{k=0}^{N-1} Y(k) e^{j\frac{2\pi}{N}nk} \qquad \text{[Math. 4]}$$

Delay time δt of a signal of the frequency fc−f relative to a signal of the center frequency fc is indicated by the following formula:

$$\delta t = L \frac{\lambda^2}{c} D(f_c - f) \qquad \text{[Math. 5]}$$

It is seen from this formula that the delay time δt is proportional to frequency spread from the center frequency fc. Chromatic dispersion D can be accurately estimated by embedding a known signal in an information sequence in advance on a transmission side and detecting and comparing the known signal on a reception side (see, for example, NPL 1).

Figure 4:
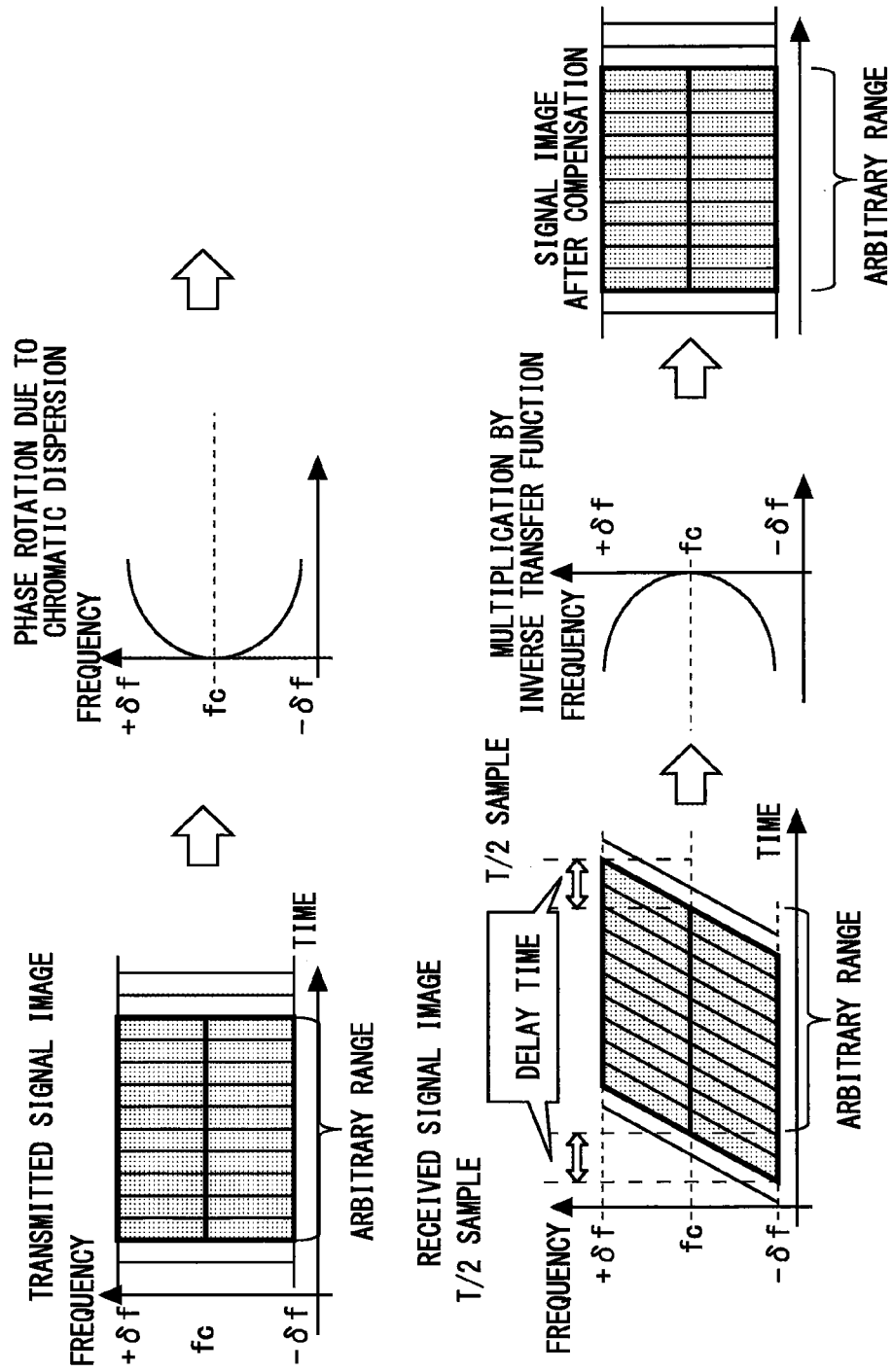
FIG. 4 is a diagram for illustrating a basic operation of chromatic dispersion compensation of the comparative example.

FIG. 4 is a diagram for illustrating a basic operation of chromatic dispersion compensation of the comparative example. The horizontal axis of a transmitted signal image shows time, and the vertical axis shows the center frequency fc and fc+δf to fc−δf corresponding to an occupied band. Thin lines indicate an image of samples. Data of each sample includes frequency components of fc±δf, and the frequency components are combined. A range surrounded by thick lines is shown for convenience so that how a range of arbitrary sample data changes later can be seen.

Here, it is assumed that, on the transmission line including the optical fiber 3, phase rotation due to chromatic dispersion, which is approximated by a quadratic function relative to a frequency difference from a center frequency, occurs. As shown in a received signal image, almost linear delay occurs in the range shown by the transmitted signal image as frequency increases. The range which is rectangular in the transmitted signal image changes to a parallelogram.

When a sampling speed is indicated by S [s/sec], sampling frequency is indicated by 1/S [sec]. Thereby, delay time D [ps] can be also indicated by D÷(1/S)=T samples. In this case, delay corresponding to T/2 samples occurs between the center frequencies fc and fc+δf, and advance corresponding to T/2 samples occurs between the center frequencies fc and fc-δf. In each sample, a delayed signal or an advanced signal from an adjoining sample is combined. These cause waveform distortion.

The delay due to chromatic dispersion described above is compensated by multiplication by an inverse transfer function shown at the lower row of FIG. 4. A signal image after the compensation is returned to a rectangular shown at a right end of the lower row of FIG. 4. This shows that signals of frequencies are adjusted in the time domain. Since delay differences among the signals of the frequencies almost disappear, the waveform distortion is eliminated.

Figure 5:
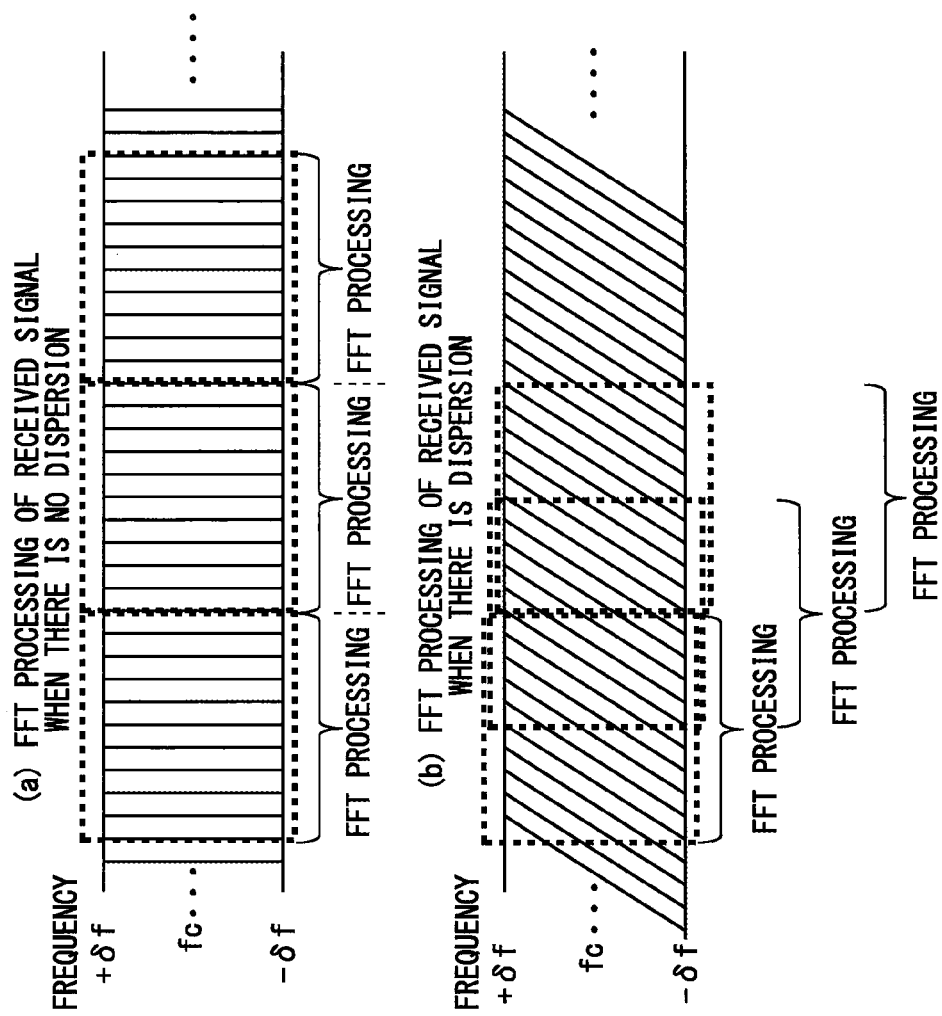
FIG. 5 is a diagram showing an FFT processing method in the chromatic dispersion compensation of the comparative example.

FIG. 5 is a diagram showing an FFT processing method in the chromatic dispersion compensation of the comparative example. Though an example of using FFT is shown here because a sampled discrete signal is processed, it goes without saying that the present operation principle is also applicable to analog processing.

If there is not chromatic dispersion, as shown in FIG. 5(*a*), FFT processing is sequentially performed without overlap. The FFT processing is speeded-up DFT (discrete Fourier transform) processing. Here, a processing procedure will be described using a general formula for DFT.

$$X(k) = \sum_{n=0}^{N-1} x(n) e^{-j\frac{2\pi}{N}nk} \qquad \text{[Math. 6]}$$

Here, x(n) indicates data obtained by sampling a received signal in a time domain, and n indicates a variable indicating order of pieces of sampled data. By multiplying n by sampling frequency, time is obtained. Here, N indicates the number of pieces of sample data in one processing and is generally referred to as "an FFT processing range", "an FFT size" or "the number of points of FFT". Further, k is a variable indicating order of pieces of data converted to a frequency domain by FFT, which is a variable related to frequencies. By multiplying k by a sampling frequency/N, a frequency is obtained.

As described above, N pieces of sample data are processed at a time in one FFT processing. Here, if there is not chromatic dispersion, frequency components of each piece of sample data are transmitted to the reception side without delay in the FFT processing range (N), and, therefore, it is not necessary to consider distortion due to delay differences relative to frequencies. Therefore, each FFT processing can be sequentially performed without overlap in consideration of delay. In this case, the number of samples which can be processed in one FFT processing remains N. Of course, it goes without saying that calculation in consideration of aliasing is required to perform the FFT processing.

However, if there is chromatic dispersion, the chromatic dispersion compensation unit 17 sequentially performs compensation processing, with a predetermined number of pieces of data as a processing range, and, between adjoining processing ranges, an overlap part where a part of data is common to the adjoining processing ranges is required as shown in FIG. 5(*b*). The amount of overlap of the overlap part is decided according to the amount of delay due to chromatic dispersion for each of a plurality of frequency bands. FIG. 5(*b*) shows an example in which a half of the FFT processing range is used as an overlap.

Figure 6:
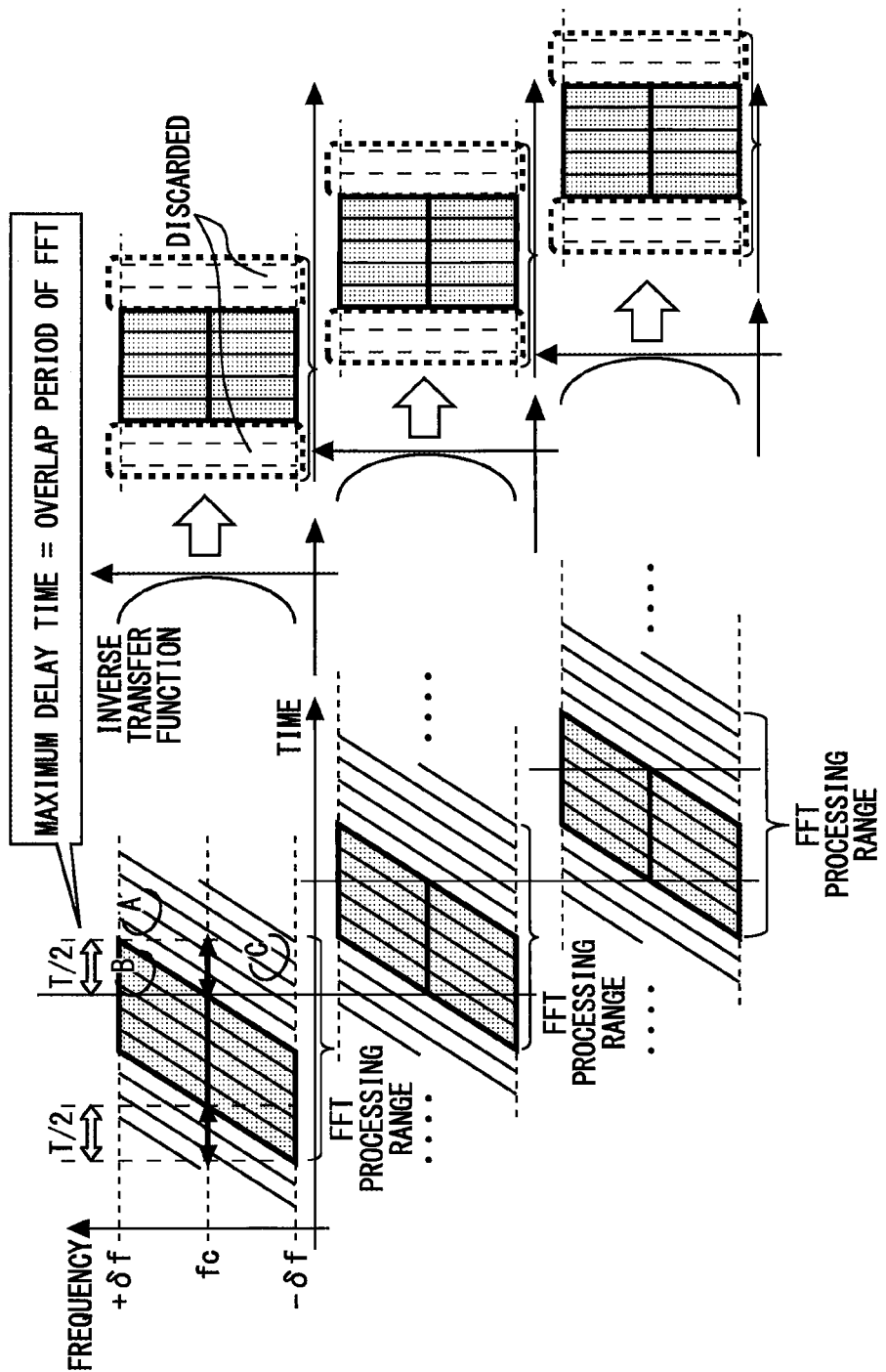
FIG. 6 is a diagram for illustrating the overlap in the FFT processing of the comparative example.

FIG. 6 is a diagram for illustrating the overlap in the FFT processing of the comparative example. In the frequency components of each piece of sample data, the amount of delay changes according to frequencies as shown in the received signal image of FIG. 4. In a figure at the top row of FIG. 6, attention will be paid to a part corresponding to T/2 samples at a rear end of the FFT processing range. With regard to sample data of this part, frequency components between the center frequencies fc and fc+δf include components A leaving the FFT processing range due to delay and components B remaining in the FFT processing range due to delay. Further, frequency components between the center frequencies fc and fc−δf include components C coming from outside of the FFT processing range due to advance.

Here, the components B are used to compensate data which is temporally earlier than the components B. The components A cannot be used for compensation in this FFT processing because they do not exist within the FFT processing range. That is, for a frequency range from fc to fc+δf corresponding to T/2, compensation is not correctly performed. Since data of the range of fc to fc−δf outside the FFT processing range come into the components C, compensation is not correctly performed for this part, either. That is, the part corresponding to T/2 is used to compensate the data which are temporally earlier than the part, compensation is not correctly performed for the part itself. Therefore, this part becomes an overlap part of each FFT processing range, which is necessary for compensation of data of a central part but is discarded after compensation processing because compensation for the part itself cannot be performed. As described above, it is generally desirable that the overlap part is set to T/2. The chromatic dispersion compensation is performed by multiplying each FFT processing result by an inverse transfer function.

From the result described above, in the case of performing FFT processing of a received signal in which delay has occurred relative to frequencies due to chromatic dispersion, overlap corresponding to the amount of delay is required. It is necessary to increase the amount of overlap, accompanying increase in delay time. Increase in the amount of overlap leads to increase in the FFT processing range, and the amount of calculation and power consumption also increase. On the contrary, if the FFT processing range (=the FFT size) is decided, an amount obtained by subtracting an overlap part from the FFT processing range is substantially a range for which compensation processing can be performed by one processing. If the range for which the compensation processing can be performed decreases, it leads to reduction in the whole processing speed.

Figure 7:
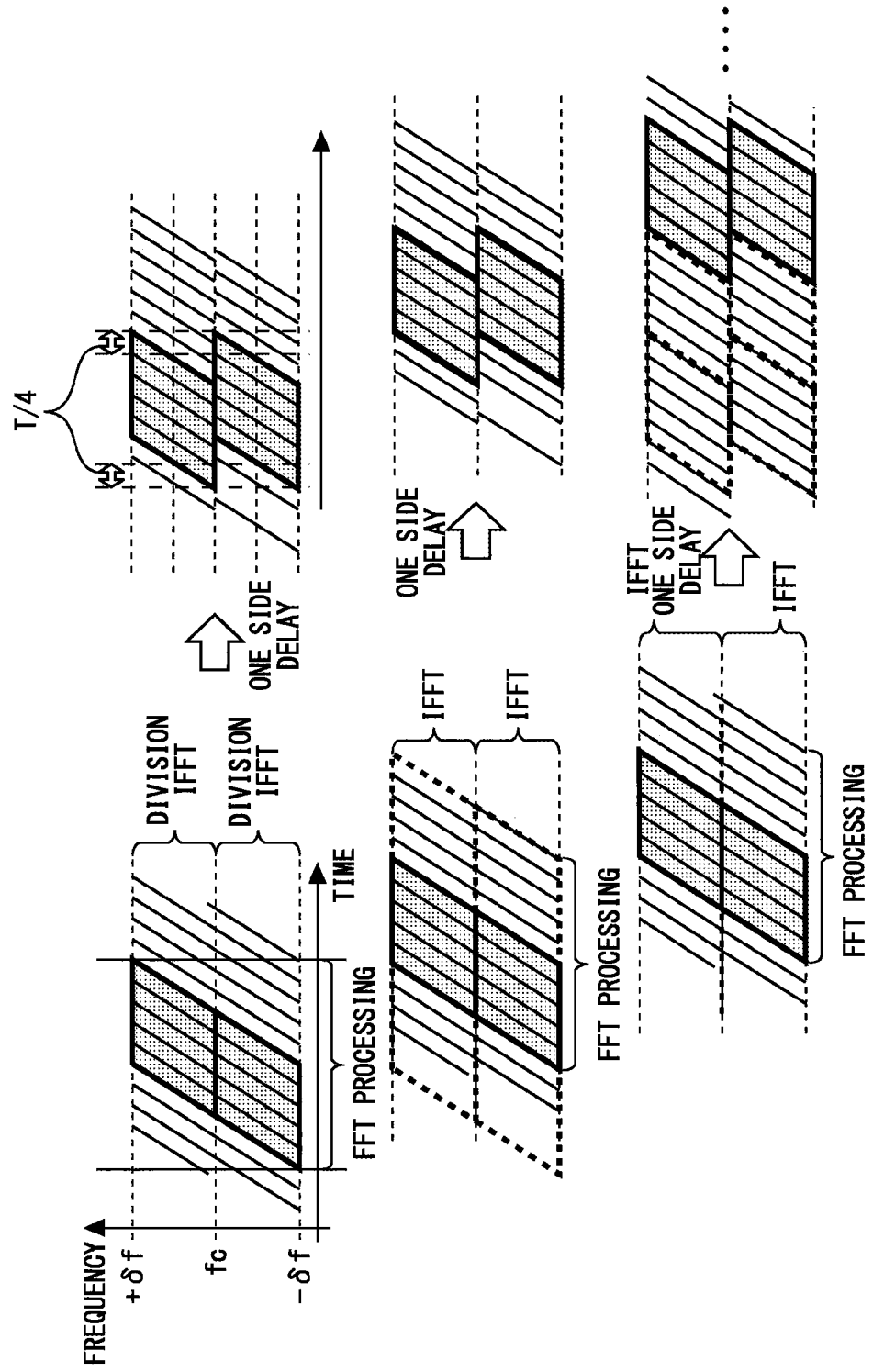
FIG. 7 is a diagram for illustrating an operation of a band division timing adjustment unit according to the first embodiment of the present invention.

FIG. 7 is a diagram for illustrating an operation of a band division timing adjustment unit according to the first embodiment of the present invention. The FFT operation unit 12 converts a received signal to a frequency domain by FFT. By dividing the output into two, a frequency band is divided into two. Next, as shown in a figure on the left side of the top row of FIG. 7, the IFFT operation units 13 and 14 convert signals of the two divided frequency bands to a time domain, respectively, by IFFT. Next, as shown in a figure on the right side of the top row of FIG. 7, the delay unit 15 inserts delay corresponding to a delay difference between the two signals on one side of each of the two signals returned to the time domain. This delay can be easily inserted by staggering the amount of sample delay. Thereby, by aligning timings of the two signals, the whole amount of delay can be reduced to half of the amount of delay before the band division. In this example, the amount of delay at each of the front and rear ends of the FFT processing can be reduced to T/4.

A processing range M of the FFT operation unit 12 of the band division timing adjustment unit 10 is not required to be the same as a processing range N of the FFT operation unit 18 of the chromatic dispersion compensation unit 17. By sequentially processing every M pieces of data, a sample data sequence in which the amount of delay due to chromatic dispersion has been reduced to half of the amount of delay before the processing can be made as shown in a figure at the lowest row of FIG. 7. Since the amount of delay of a signal in each band is reduced to ½ in comparison with the comparative example, the amount of overlap in the FFT processing by the chromatic dispersion compensation unit 17 can be reduced to half. In the present embodiment, an example in which FFT is used for the band division timing adjustment unit 10 has been shown. However, this is not limitative. Any method for dividing a frequency, such as a band filter, may be adopted.

Figure 8:
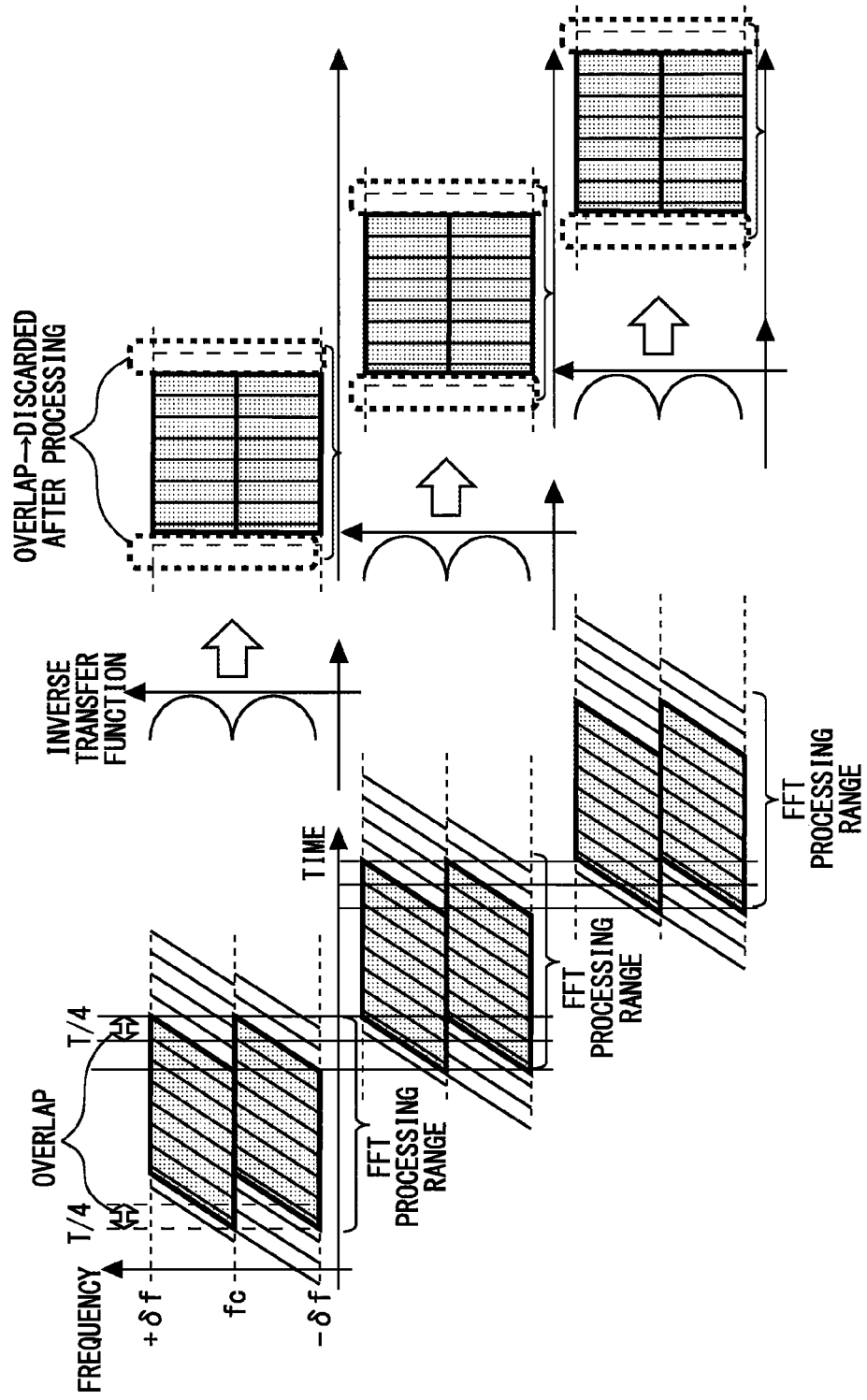
FIG. 8 is a diagram for illustrating an operation principle of a chromatic dispersion compensation unit according to the first embodiment of the present invention.

Though the configuration of the chromatic dispersion compensation unit 17 according to the present embodiment is basically the same as the configuration of the comparative example, setting of a function for the inverse transfer function multiplication unit 19 is different. FIG. 8 is a diagram for illustrating an operation principle of a chromatic dispersion compensation unit according to the first embodiment of the present invention.

The amount of delay related to chromatic dispersion in each of the two signals for which delay has been adjusted by the band division timing adjustment unit 10 have been half of the amount of delay of the comparative example. Therefore, as shown at the top row of FIG. 8, the amount of overlap in the FFT processing by the chromatic dispersion compensation unit 17 can be reduced to T/4, which is half of the amount of overlap of the comparative example. Furthermore, since it is thought that chromatic dispersion has occurred in each of the two frequency bands of the signals, compensation by multiplication by an inverse transfer function is executed for each of the frequency bands. Specifically, like the inverse transfer function shown in FIG. 8, a conjugate value of a quadratic function for each of the frequency bands becomes an inverse transfer function.

In the present embodiment, the amount of overlap is T/4 samples on one side. The FFT processing range is N samples. Therefore, when the amounts of overlap on both sides are subtracted from the N samples, the number of samples processed by one FFT processing is N−T/4×2. On the other hand, in the comparative example, since the amount of overlap is T/2 samples on one side, the number of samples processed by one FFT processing is N−T/2×2. In the case of ½ overlap FFT, in which half of the FFT processing range N is overlapped, N=T/2×2×2=2T is obtained. Therefore, the number of samples processed by one FFT processing is N−T/2×2=T in the comparative example, and N−T/4×2=(3/2)T in the present embodiment. Therefore, the processing speed of the present embodiment is 1.5 times faster in comparison with the comparative example. Further, power required for processing for overlap can be also reduced to half.

Figure 9:
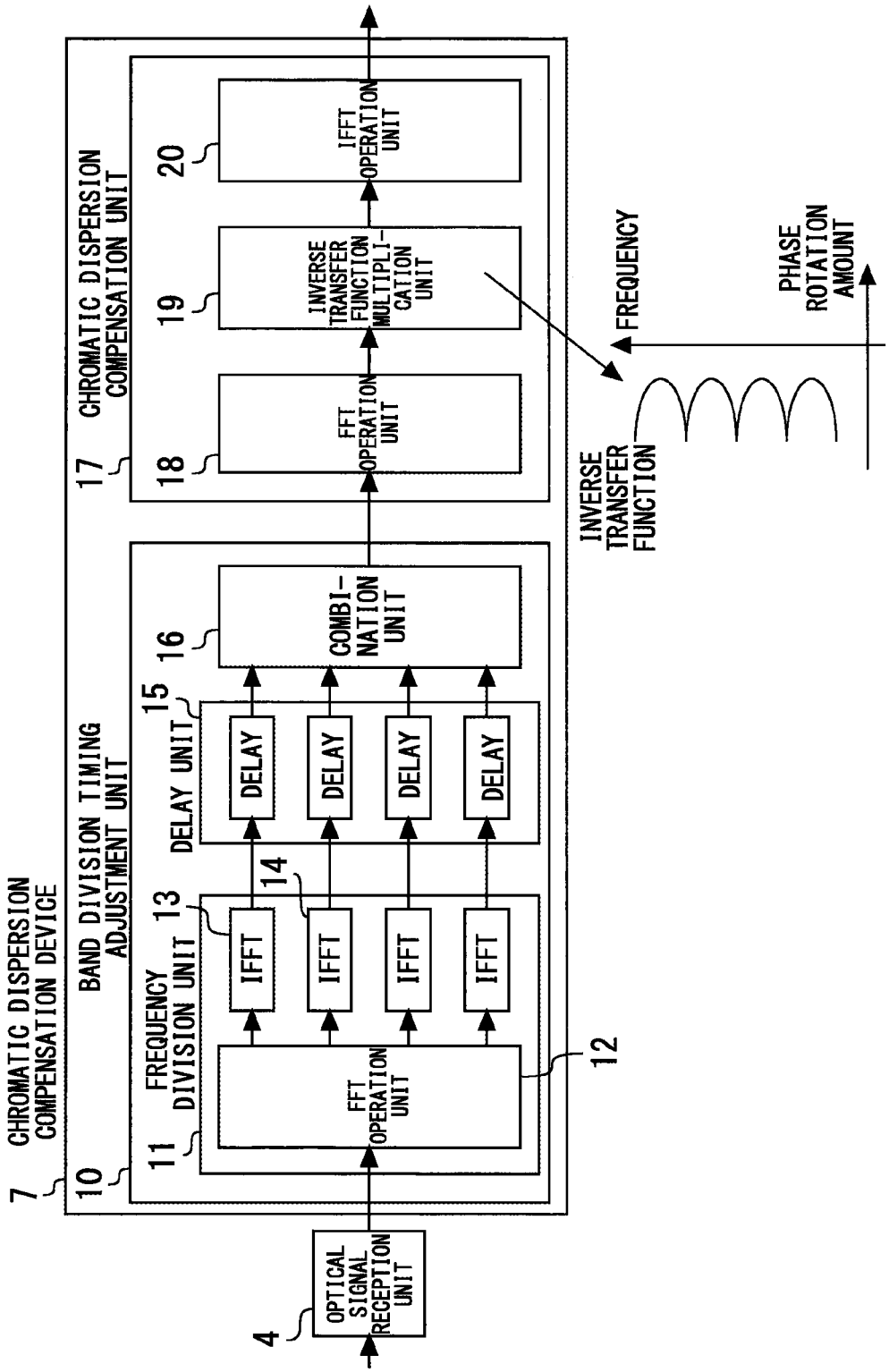
FIG. 9 is a diagram showing an example in which the chromatic dispersion compensation device according to the first embodiment of the present invention is generalized.

FIG. 9 is a diagram showing an example in which the chromatic dispersion compensation device according to the first embodiment of the present invention is generalized. In this example, the embodiment described above is further generalized, and a frequency band is divided into a plurality of frequency bands to perform processing. That is, the band division timing adjustment unit 10 divides a received signal delayed according to frequencies due to chromatic dispersion, according to a plurality of frequency bands. Specifically, the FFT operation unit 12 converts an inputted signal to a frequency domain by FFT, divides the signal according to the plurality of frequency bands and outputs the signals. The plurality of IFFT operation units 13 and 14 convert the plurality of output signals of the FFT operation unit 12, respectively, to a time domain, and obtain a plurality of signals. The delay unit 15 adjusts the amounts of delay of the plurality of signals to align timings in the time domain. The combination unit 16 combines the plurality of signals for which the timings have been aligned.

The chromatic dispersion compensation unit 17 compensates chromatic dispersion of the output signal of the band division timing adjustment unit 10 for each of the plurality of frequency bands. Specifically, the FFT operation unit 18 converts the inputted signal to a frequency domain by FFT. The inverse transfer function multiplication unit 19 multiplies the output signal of the FFT operation unit 18 by an inverse transfer function which compensates, for each of the plurality of frequency bands, chromatic dispersion corresponding to the frequency band. The IFFT operation unit 20 converts the output signal of the inverse transfer function multiplication unit 19 to a time domain by inverse Fourier transform.

Since each of the frequency bands of the plurality of divided signals is smaller in comparison with the frequency band of the original received signal, the amount of delay due to chromatic dispersion in each of the divided signals is also smaller than the amount of delay of the original received signal. Therefore, the amount of delay in each band is reduced to be smaller than the amount of delay of the band before division. Further, by aligning timings of the plurality of signals divided according to the frequency bands, the total amount of delay can be reduced. Therefore, since processing required for compensation can be reduced, it is possible, even when delay time due to chromatic dispersion is long, to efficiently perform chromatic dispersion compensation.

In the compensation processing such as Fourier transform in the chromatic dispersion compensation unit 17, it is necessary to increase the amount of overlap between adjoining processing ranges according to the amount of delay. In comparison, in the present embodiment, the band division timing adjustment unit 10 performs shift adjustment of a plurality of signals divided according to a plurality of frequency bands in a time domain to align timings. Therefore, even when delay time due to chromatic dispersion is long, the amount of overlap for chromatic dispersion compensation does not have to be increased. Therefore, it is possible to improve the processing speed and limit power consumption. In the present example, the larger the number of divided frequencies is, the more the effect is improved. However, the effect is saturated, and, at the same time, the circuit is complicated. It is desirable to decide the substantial number of divided frequencies in consideration of the above balance.

Second Embodiment

In the first embodiment, a received signal is band-divided; delay adjustment is performed in a time domain; and chromatic dispersion compensation is performed for the time signals. Since each of these is independent linear processing in the time domain, a similar effect is obtained even if they are performed in opposite order.

Figure 10:
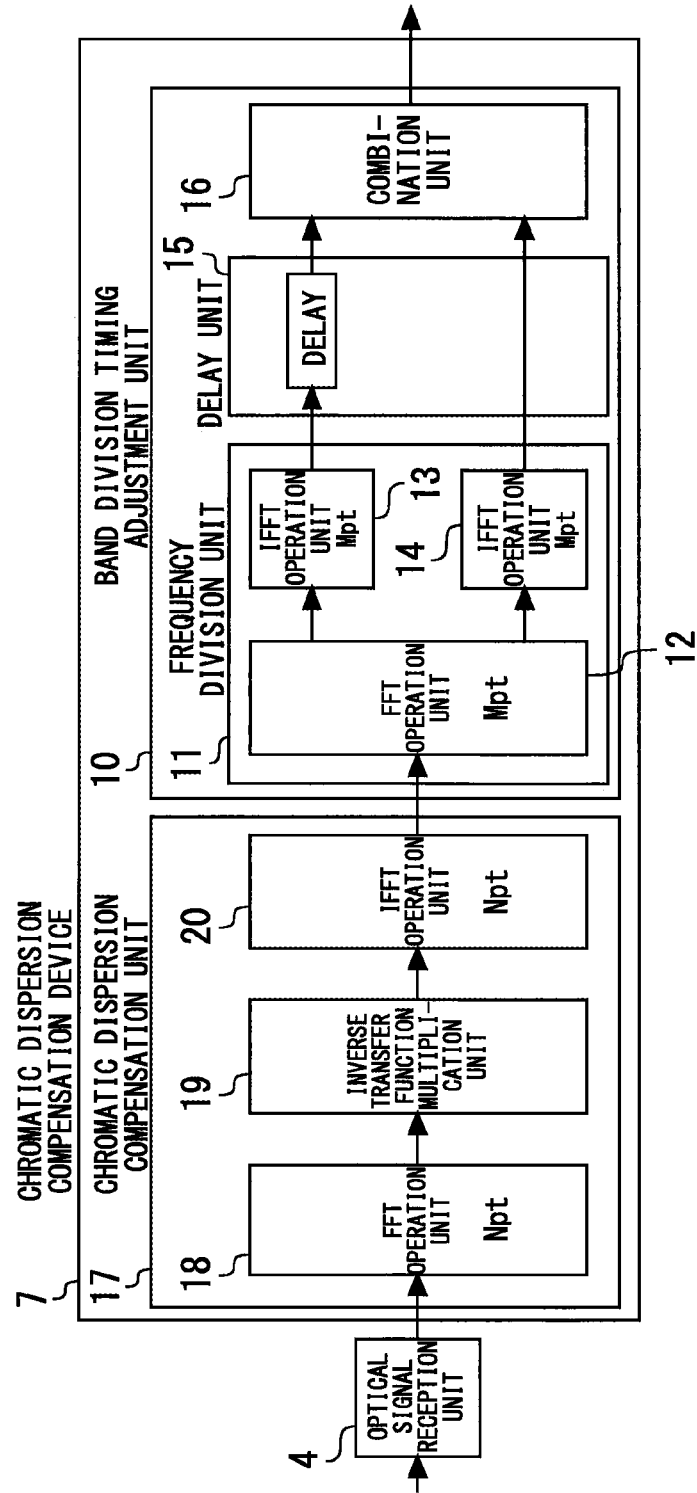
FIG. 10 is a diagram showing a chromatic dispersion compensation device according to a second embodiment of the present invention.

FIG. 10 is a diagram showing a chromatic dispersion compensation device according to a second embodiment of the present invention. The band division timing adjustment unit 10 and the chromatic dispersion compensation unit 17 are reversely arranged in comparison with the first embodiment. Though the configuration of the chromatic dispersion compensation unit 17 is basically the same as the configuration of the comparative example, setting of a function for the inverse transfer function multiplication unit 19 is different.

Figure 11:
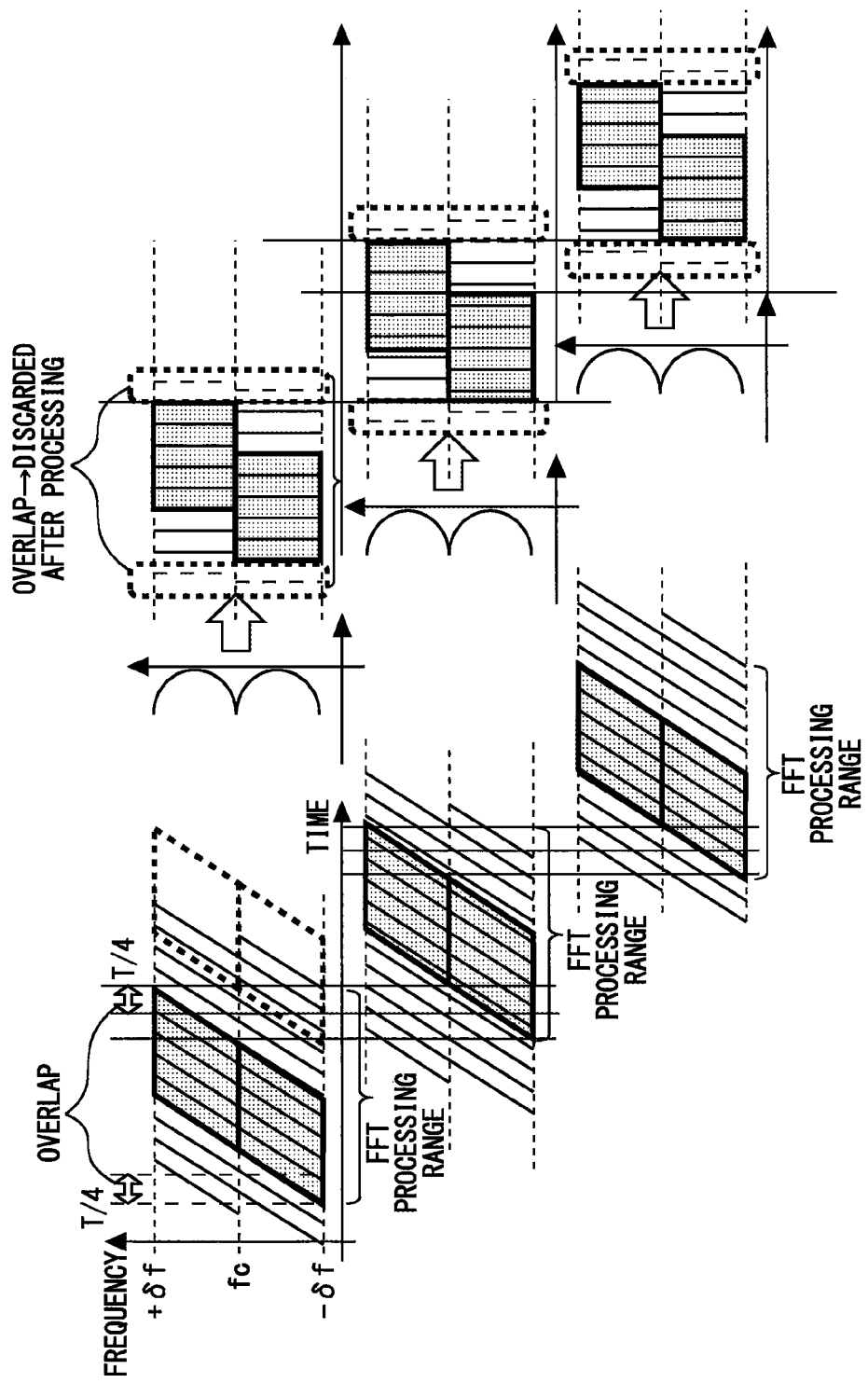
FIG. 11 is a diagram for illustrating an operation of a chromatic dispersion compensation unit according to the second embodiment of the present invention.

FIG. 11 is a diagram for illustrating an operation of a chromatic dispersion compensation unit according to the second embodiment of the present invention. In a received signal, delay corresponding to T samples has occurred relative to a frequency band due to chromatic dispersion. A parallelogram surrounded by thick lines and depicted in an FFT processing range is depicted for convenience in order to understandably express the delay relative to the frequency band and does not indicate only data to be compensated for.

The chromatic dispersion compensation unit 17 performs processing similar to the processing of the first embodiment. That is, FFT processing is performed, with the amount of overlap set to T/4 samples on each side of the front and rear ends of an FFT processing range, and a frequency band is divided into frequency bands each of which corresponds to the amount of delay which can be processed with the amount of overlap. By setting an inverse transfer function for each of the divided frequency bands, compensation processing is performed by one multiplication.

Thereby, compensation is performed for each of the frequency bands. However, between signals of two compensated frequency bands, a delay difference which is almost the same as a delay difference between signals of the two frequency bands before compensation occurs as shown at the right end of the top row of FIG. 11. In the next FFT processing range, similar signals are formed. The signals of the two frequency bands having the delay difference are supplied to the band division timing adjustment unit 10 in a time domain.

Figure 12:
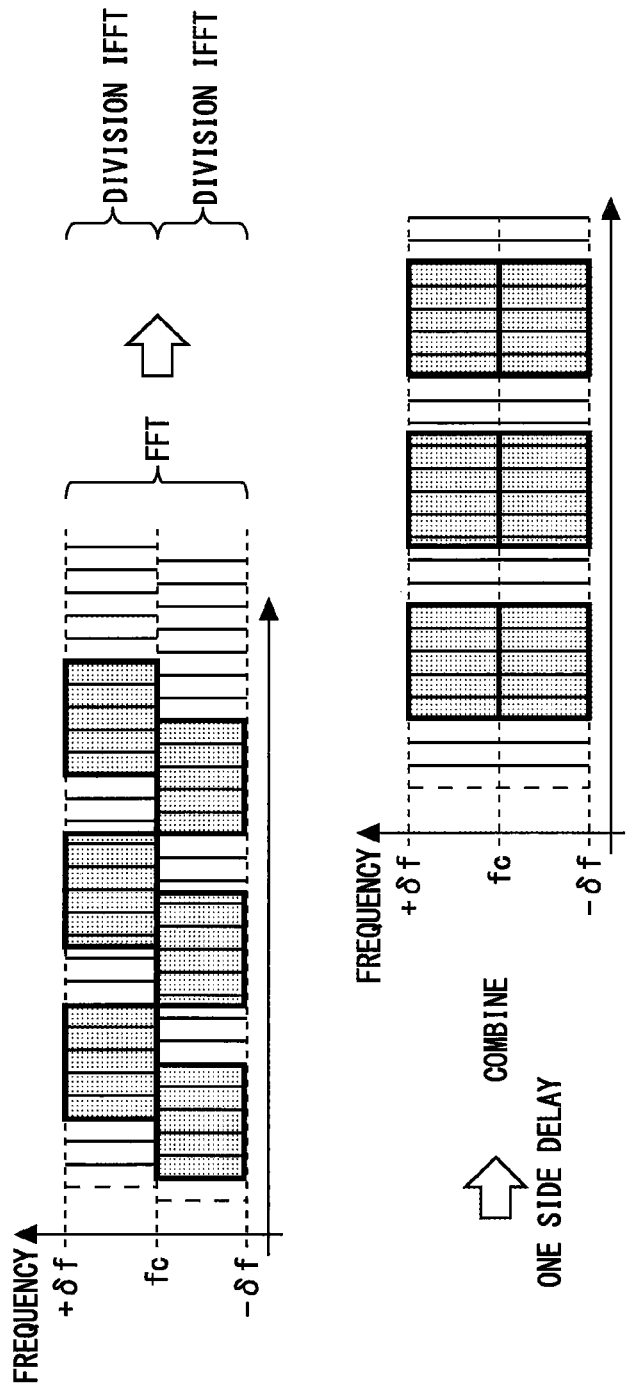
FIG. 12 is a diagram for illustrating an operation of a band division timing adjustment unit according to the second embodiment of the present invention.

FIG. 12 is a diagram for illustrating an operation of a band division timing adjustment unit according to the second embodiment of the present invention. The FFT operation unit 12 converts the signals inputted to the band division timing adjustment unit 10 to a frequency domain again by FFT, and divides the signal according to the frequency bands divided by the chromatic dispersion compensation unit 17. The IFFT operation units 13 and 14 cause each of the signals to be a time-domain signal by IFFT. The delay unit 15 inserts, on one side of each of two signals returned to a time domain, delay corresponding to a delay difference between the two signals to align timings of the two signals. Next, the combination unit 16 combines the two shift-adjusted signals.

By the above process, similarly to the first embodiment, the amount of overlap in the FFT processing by the chromatic dispersion compensation unit 17 can be reduced half of the amount of overlap of the comparative example. Therefore, after subtracting the amount of overlap from the FFT processing range, the amount of FFT processing performed per time and the processing speed are 1.5 times larger and faster than the comparative example. Further, power required for processing for overlap can be reduced to half.

Figure 13:
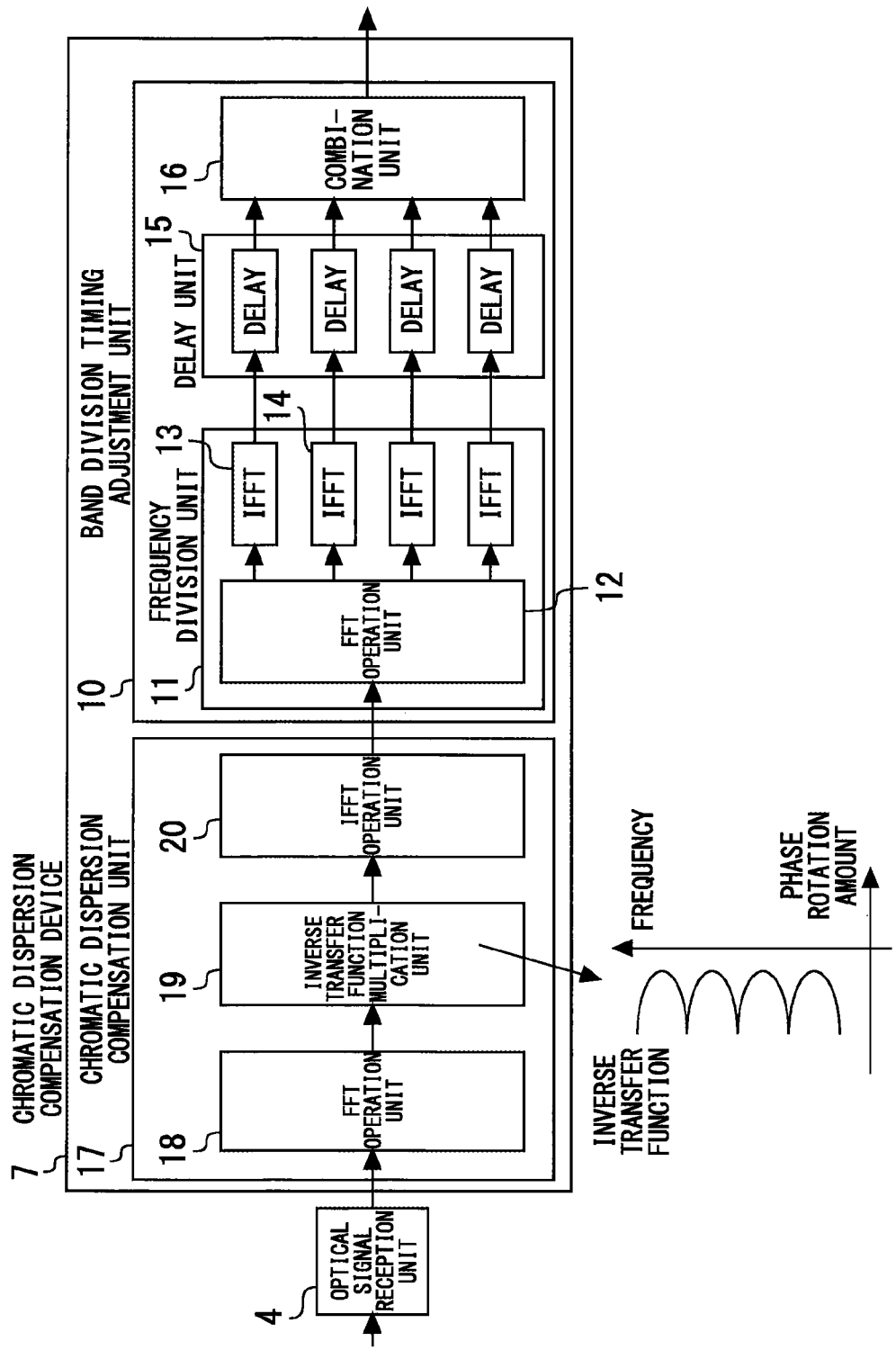
FIG. 13 is a diagram showing an example in which the chromatic dispersion compensation device according to the second embodiment of the present invention is generalized.

FIG. 13 is a diagram showing an example in which the chromatic dispersion compensation device according to the second embodiment of the present invention is generalized. In this example, the embodiment described above is further generalized, and a frequency band is divided into a plurality of frequency bands to perform processing.

For each of a plurality of frequency bands, an inverse transfer function to compensate delay which occurs due to chromatic dispersion of the frequency band is set for the inverse transfer function multiplication unit 19 of the chromatic dispersion compensation unit 17. When the number of divided frequency bands is indicated by p, the amount of delay of each of the frequency bands after division is 1ip of the amount of delay before the division. Therefore, the amount of overlap in FFT processing can be reduced to be 1ip of the amount of overlap before the division. In a received signal compensated by the chromatic dispersion compensation unit 17, a delay difference almost equal to the amount of delay of 1ip occurs among the plurality of frequency bands in a time domain. Therefore, after the band division timing adjustment unit 10 divides the signal according to the plurality of frequency bands, a plurality of delay units 15 perform shift adjustment of the plurality of signals in the time domain to adjust the amounts of delay due to chromatic dispersion. Thereby, similarly to the first embodiment, timings of the signals of the plurality of frequency bands are adjusted to correspond to one another.

Thereby, the amount of overlap in FFT processing by the chromatic dispersion compensation unit 17 can be reduced to be smaller than the example of FIG. 10. Since the amount of FFT processing performed per time can be increased by that amount, the processing speed is increased. Further, power required for processing for overlap can be reduced to lip. In the present example, the larger the number of divided frequencies is, the more the effect is improved. However, the effect is saturated, and, at the same time, the circuit is complicated. It is desirable to decide the substantial number of divided frequencies in consideration of the above balance.

Though an example of configuring the chromatic dispersion compensation unit 17 with FFT is shown in the first and second embodiments, the configuration is not limited to this configuration. For example, if the IFFT operation unit 20 and the FFT operation unit 12 in FIGS. 10 and 13 are connected as in FIGS. 10 and 13, operations are identical operations for data. Therefore, the operation can be omitted. That is, an output of the inverse transfer function multiplication unit 19 can be directly inputted to the IFFT operation units of the frequency division unit 11. In this case, even if there is a difference in the number of points of FFT operation, it is only necessary to cause divided frequency bands to be almost the same. It is only necessary that the chromatic dispersion compensation unit 17 sequentially performs compensation processing, with a predetermined number of pieces of data (finite sample data) as a processing range, and, between adjoining processing ranges, an overlap part where a part of data is common to the processing ranges exists. In this case, by combining the band division timing adjustment unit 10 which divides a frequency band to reduce delay in each band, the amount of overlap can be reduced similarly to the above description. For example, the chromatic dispersion compensation unit 17 can be configured with a finite impulse response (FIR) filter. In this case, an impulse response generated by performing inverse Fourier transform of the above inverse transfer function to compensate, for each of a plurality of frequency bands, chromatic dispersion according to the frequency band can be used as a filter coefficient of the finite impulse response filter. This method is used as a transversal filter (see, for example, NPL 1).

A program for implementing the chromatic dispersion compensation method according to the first and second embodiments may be recorded in a computer-readable recording medium so that the program recorded in the recording medium is read in and executed by a computer system or a programmable logic device to perform the chromatic dispersion compensation. The "computer system" described here may contain hardware such as OS, peripheral equipment, etc. The "computer system" may contain a WWW system having a homepage providing environment (or displaying environment). The "computer-readable recording medium" may be a portable medium such as a flexible disc, a magneto-optic disc, ROM and CD-ROM, or a storage device such as a hard disc incorporated in a computer system. Furthermore, the "computer-readable recording medium" may contain an element for holding a program for a constant time like a volatile memory (RAM) in a computer system serving as a server or a client when a program is transmitted through a network such as the Internet or a communication line such as a telephone line.

The program may be transmitted from a computer system having a storage device or the like in which the program is stored, to another computer system via a transmission medium or by transmission waves in a transmission medium. Here, the "transmission medium" for transmitting the program is a medium having a function of transmitting information like a network (communication network) such as the Internet or a communication circuit (communication line) such as a telephone line or the like. The program may be provided to perform a part of the foregoing function. Furthermore, the program may be provided to perform the foregoing function in combination with a program which has been already stored in the computer system, so-called a differential file (differentia program).

REFERENCE SIGNS LIST

4 optical signal reception unit; 7 chromatic dispersion compensation device; 8 polarization processing/adaptive equalization unit; 9 error correction unit; 10 band division timing adjustment unit; 12 FFT operation unit (second fast Fourier transform unit); 13,14 IFFT operation unit (second inverse fast Fourier transform unit); 15 delay unit; 16 combination unit; 17 chromatic dispersion compensation unit; 18 FFT operation unit (first fast Fourier transform unit); 19 inverse transfer function multiplication unit; 20 IFFT operation unit (first inverse fast Fourier transform unit)

The invention claimed is:

1. A chromatic dispersion compensation device comprising:
   chromatic dispersion compensation processor circuitry configured to sequentially perform compensation processing with a predetermined number of pieces of data in a received signal as a processing range and to compensate chromatic dispersion of the predetermined number of pieces of data for each of a plurality of frequency bands; and
   band division timing adjustment processor circuitry configured to align timing between a plurality of signals, which are generated by dividing an output signal of the chromatic dispersion compensation processor circuitry according to the plurality of frequency bands, in a time domain and combining the plurality of signals for which the timings have been aligned,
   wherein the chromatic dispersion compensation processor circuitry compensates the chromatic dispersion of the predetermined number of pieces of data for each of the plurality of frequency bands by setting an inverse transfer function collectively for the plurality of frequency bands and applying the inverse transfer functions collectively to the predetermined number of pieces of data.

2. The chromatic dispersion compensation device according to claim 1, wherein when the chromatic dispersion compensation processor circuitry sequentially performs the compensation processing, with the predetermined number of pieces of data as the processing range, between adjoining processing ranges, an overlap part where a part of data is common to the processing ranges exists.

3. The chromatic dispersion compensation device according to claim 2, wherein an overlap amount of the overlap part depends on chromatic dispersion for each of the plurality of frequency bands.

4. The chromatic dispersion compensation device according to claim 2, wherein the chromatic dispersion compensation processor circuitry includes:

a fast Fourier transformer configured to convert an inputted signal to a frequency domain by Fourier transform;

an inverse transfer function multiplier configured to multiply an output signal of the fast Fourier transform unit by an inverse transfer function which compensates, for each of the plurality of frequency bands, chromatic dispersion corresponding to the frequency band; and an inverse fast Fourier transformer configured to convert an output signal of the inverse transfer function multiplier to a time domain by inverse Fourier transform.

5. The chromatic dispersion compensation device according to claim 2, wherein the chromatic dispersion compensation processor circuitry includes a finite impulse response filter, a filter coefficient of the finite impulse response filter is an impulse response generated by performing inverse Fourier transform of an inverse transfer function which compensates, for each of the plurality of frequency bands, chromatic dispersion according to the frequency band.

6. The chromatic dispersion compensation device according to claim 1, wherein the band division timing adjustment processor circuitry includes:

a fast Fourier transformer configured to convert an inputted signal to a frequency domain by Fourier transform and dividing the converted signal according to the plurality of frequency bands;

a plurality of inverse fast Fourier transformers configured to convert a plurality of output signals of the fast Fourier transformer to a time domain respectively to obtain the plurality of signals;

delay processor circuitry configured to adjust delay amounts of the plurality of signals to align timings in the time domain; and combination processor circuitry configured to combine the plurality of signals for which the timings have been aligned.

7. A communication device comprising:

a chromatic dispersion compensation device comprising:

chromatic dispersion compensation processor circuitry configured to sequentially perform compensation processing with a predetermined number of pieces of data in a received signal as a processing range and to compensate chromatic dispersion of the predetermined number of pieces of data for each of a plurality of frequency bands; and band division timing adjustment processor circuitry configured to align timing between a plurality of signals, which are generated by dividing an output signal of the chromatic dispersion compensation processor circuitry according to the plurality of frequency bands, in a time domain and combining the plurality of signals for which the timings have been aligned, wherein the chromatic dispersion compensation processor circuitry compensates the chromatic dispersion of the predetermined number of pieces of data for each of the plurality of frequency bands by setting an inverse transfer function collectively for the plurality of frequency bands and applying the inverse transfer functions collectively to the predetermined number of pieces of data, the chromatic dispersion compensation device compensating a distortion of the received signal due to chromatic dispersion;

a polarization processing/adaptive equalizer configured to perform equalization processing for compensating a distortion of the received signal due to polarization fluctuation; and an error corrector configured to detect and correct an error of the received signal.

8. The communication device according to claim 7, further comprising an optical signal receptor configured to receive an optical signal and converting the optical signal to the received signal.

9. A chromatic dispersion compensation method comprising:

sequentially performing compensation processing with a predetermined number of pieces of data in a received signal as a processing range and compensating chromatic dispersion of the predetermined number of pieces of data for each of a plurality of frequency bands by chromatic dispersion compensation processor circuitry; and aligning timing between a plurality of signals, which are generated by dividing an output signal of the chromatic dispersion compensation processor circuitry according to the plurality of frequency bands, in a time domain and combining the plurality of signals for which the timings have been aligned, by a band division timing adjustment unit, wherein the chromatic dispersion compensation processor circuitry compensates the chromatic dispersion of the predetermined number of pieces of data for each of the plurality of frequency bands by setting an inverse transfer function collectively for the plurality of frequency bands and applying the inverse transfer functions collectively to the predetermined number of pieces of data.

\* \* \* \* \*